Robert S. Mueller and
Thomas A. Penkaliski,
Inventors.
Koenig, Senniger, Powers and Leavitt,
Attorneys.

United States Patent Office

3,498,682
Patented Mar. 3, 1970

3,498,682
BRAKING SYSTEM
Robert S. Mueller, Southfield, and Thomas A. Penkalski, Auburn, N.Y., assignors to Eaton Yale & Towne, Inc., Cleveland, Ohio, a corporation of Ohio
Filed Sept. 5, 1967, Ser. No. 665,609
Int. Cl. B60t 8/06
U.S. Cl. 303—21                                    19 Claims

ABSTRACT OF THE DISCLOSURE

An automobile anti-skid braking system is disclosed in which the braking force is reduced when the wheel speed drops below the vehicle speed. The wheel speed is measured by means of a tachometer and a signal which is an analog of the actual speed of the vehicle is obtained by integrating a deceleration signal obtained from an accelerometer which responds to changes in the vehicle speed. Integration is performed by means of a capacitor which is initially charged to a voltage corresponding to the vehicle speed and is then discharged at a rate which varies as a function of the decelaration of the vehicle.

BACKGROUND OF THE INVENTION

This invention relates to a braking system for a wheeled vehicle and more particularly to such a system which reduces the braking force when wheel speed drops below vehicle speed.

Various systems have been proposed for automatically correcting skidding conditions when braking a wheeled vehicle. In some of these, the wheel speed is prevented from falling faster than a predetermined rate. Such rate, however, is typically fixed and thus is correct only for one set of traction conditions rather than for all. In another system the speed of one wheel is compared against the speed of others to determine if there is any substantial discrepancy in speed indicating a skid. This latter system, however, typically requires separate braking means for the different wheels and operates properly only if less than all of the wheels begin to skid.

SUMMARY OF THE INVENTION

Among the several objects of the present invention may be noted the provision of a braking system for a wheeled vehicle which will reduce the braking force when the wheel speed drops below the vehicle speed; the provision of such a system in which the vehicle speed is determined or computed independent of the speed of any wheel; the provision of such a system which permits different braking rates under different traction conditions; the provision of such a system which is highly reliable; and the provision of such a system which is relatively simple and inexpensive. Other objects and features will be in part apparent and in part pointed out hereinafter.

Briefly, a braking system according to this invention is useful in a wheeled vehicle provided with brake means for applying a braking force to at least one wheel thereof. The system includes means for generating a wheel speed signal which varies as a function of the speed of the wheel and means, including an accelerometer, for providing a deceleration signal which varies as a function of the deceleration of the vehicle independently of the wheel speed. The deceleration signal is integrated to obtain a signal which is an analog of the speed of the vehicle. The braking force is then varied in response to the wheel speed and analog signals to prevent the wheel speed from dropping substantially below the vehicle speed as represented by the analog signal. Thus substantial skidding of of the wheel is prevented.

DESCRIPTION OF THE PREFERRED EMBODIMENT

Figure 1:
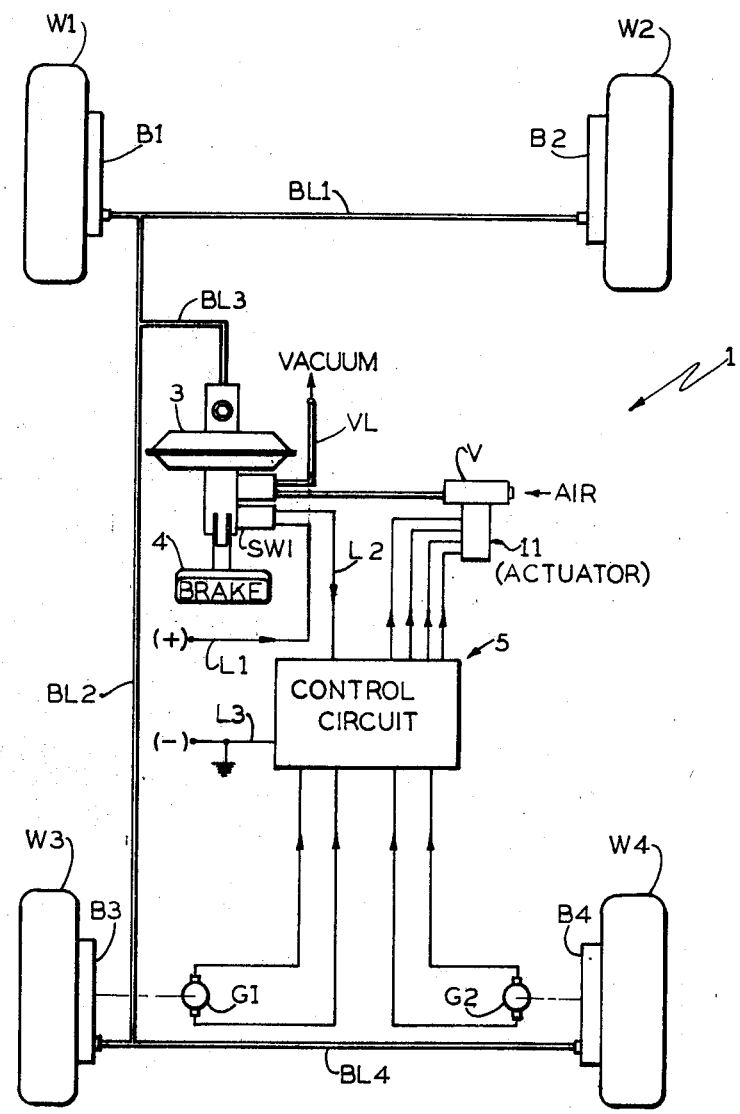
FIG. 1 is a diagrammatic illustration of an automobile employing an anti-skid braking system according to the present invention.

Referring now to the drawings, the anti-skid braking system illustrated there is adapted for use on a vehicle such as an automobile as indicated generally at 1 in FIG. 1 having a plurality of wheels W1–W4 provided with respective brakes B1–B4. Brakes B1–B4 may be actuated together by either a common or a split hydraulic system. A common hydraulic system is shown in FIG. 1 comprising a plurality of brake lines BL1–BL4. Pressure is selectively applied to the hydraulic system by a vacuum-operated power brake booster system indicated at 3 when a brake pedal 4 is depressed. A vacuum is provided to the power brake system through a vacuum line VL, e.g., from the intake manifold of the automobile engine (not shown) in conventional manner. As is described in greater detail hereinafter, the braking force applied is selectively reduced by a control circuit 5 to prevent skidding. Control circuit 5 reduces the braking force by variably energizing an actuator 11 to open a valve V which bleeds air into the vacuum-operated booster system.

Direct current for energizing the system, e.g., at 12 volt positive potential, is obtained from the automobile's battery through a lead L1. Lead L1 is connected to a main system supply lead L2 through a switch SW1. Switch SW1 is operated to a closing position by the first movement of the brake pedal 4. A negative system supply lead L3 is connected to ground relative to the automobile's electrical system.

Figure 2:
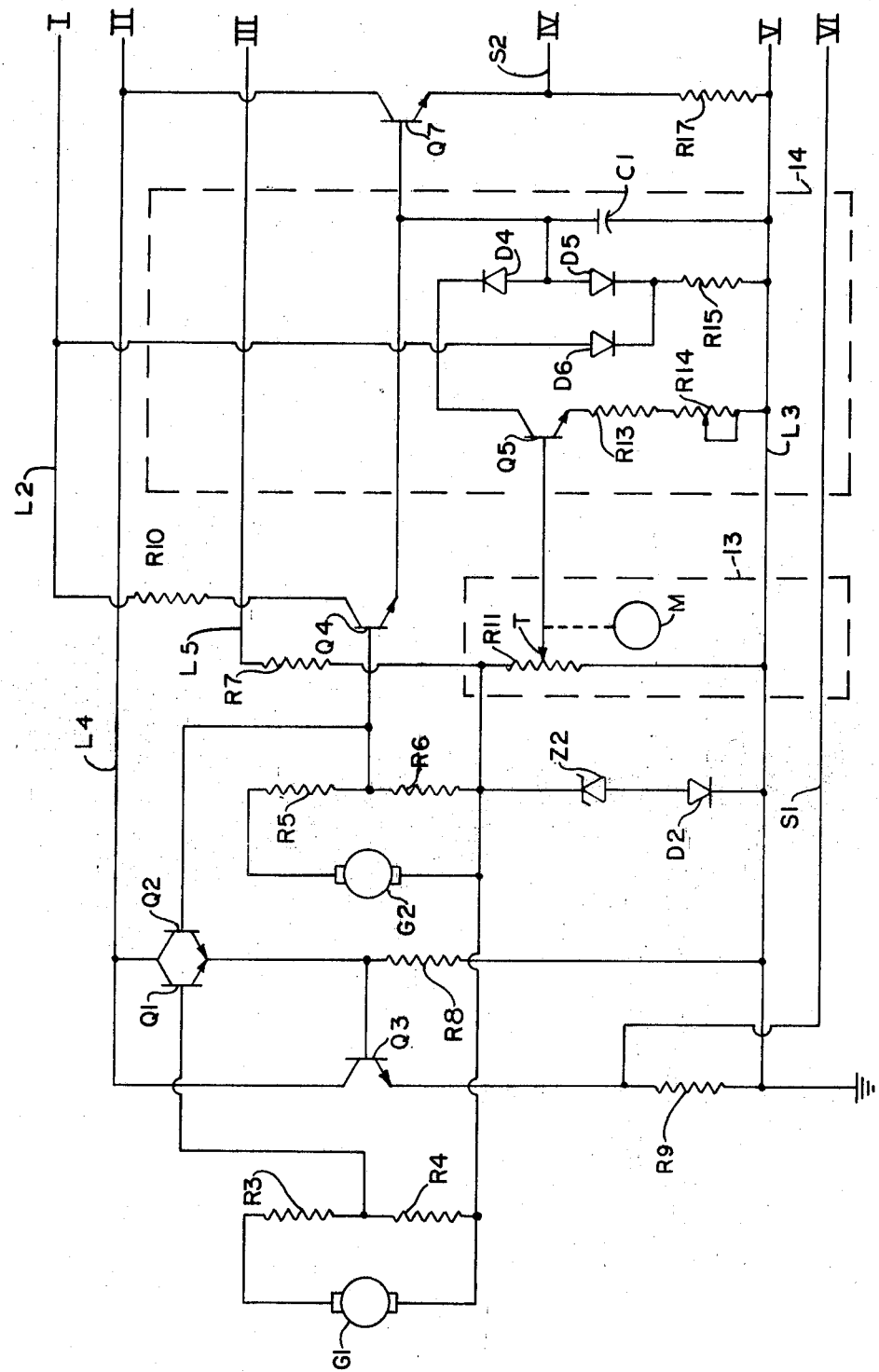
FIGS. 2 and 3 together are a schematic circuit diagram of the anti-skid braking system, connections between the two portions of the circuit being indicated by corresponding Roman numerals.
Figure 3:
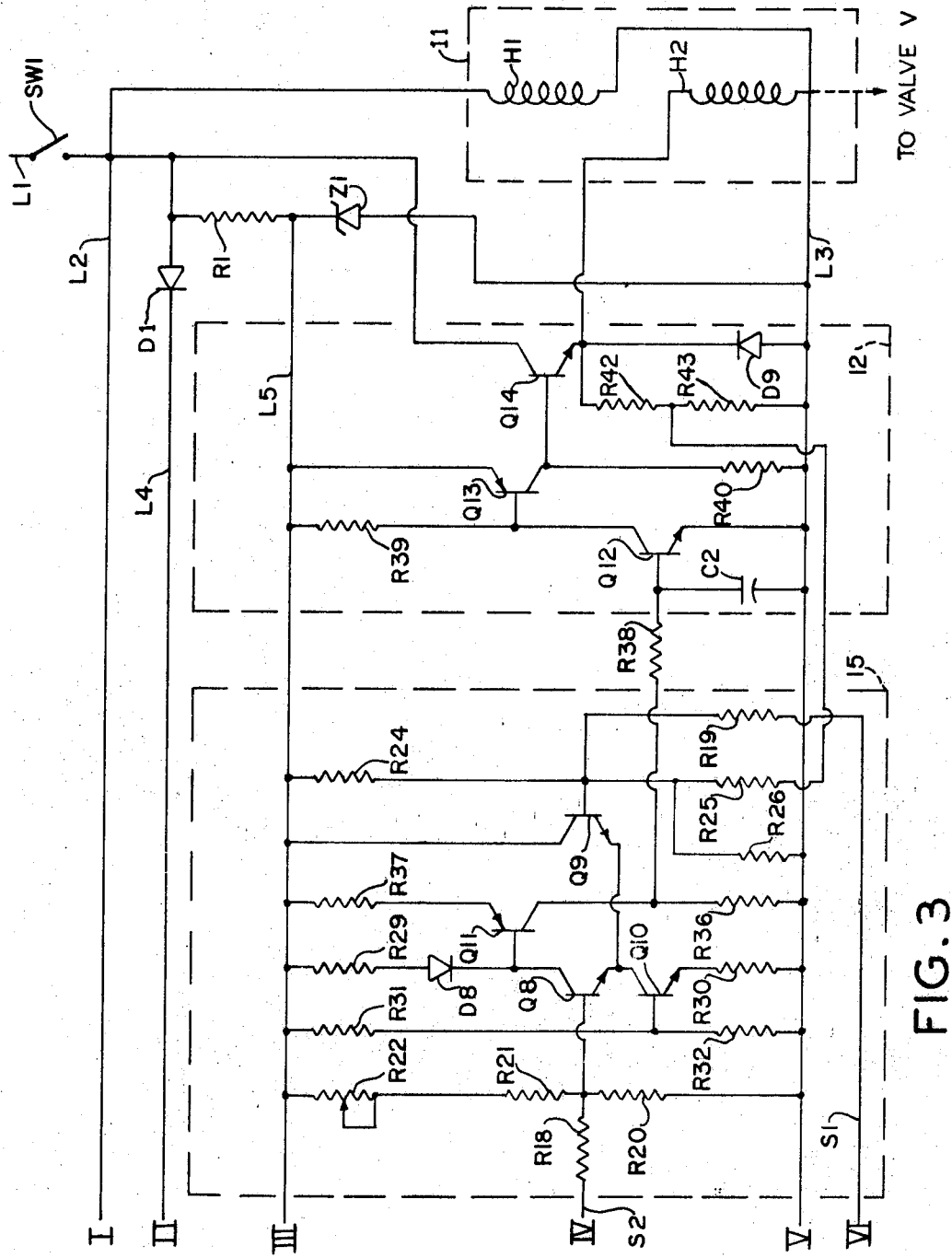

Referring now to FIGS. 2 and 3, actuator 11 preferably comprises a linear motor of the type conventionally employed in loudspeakers and includes a field coil H1 which provides a polarizing magnetic field and an armature coil H2 which is movable within that field. Armature coil H2, when energized, exerts a force which is substantially proportional to the energizing current. The field coil H1 is connected directly between leads L2 and L3 and is thus energized whenever the anti-skid braking system is energized by switch SW1. The armature coil H2 is variably energized by a power amplifier which is indicated generally at 12 and which is described in greater detail hereinafter. Armature coil H2 controls the braking system, e.g., by being coupled to bleed valve V as described previously, to produce a decrease in braking force which varies as a function of the output voltage from amplifier 12.

A second system positive supply lead L4 is connected to L2 through a diode D1 which protects transistors Q1, Q2 and Q3 from generators G1 and G2 and which isolates lead L4 from inductive surges which may be produced by field coil H1. Current drawn from lead L2 is also applied, through a dropping resistor R1, to a Zener diode Z1 which provides a regulated D.C. voltage source, e.g., at about 8.2 volts between a third supply lead L5 and lead L3.

The left and right rear wheels of the automobile are provided with respective D.C. tachometer generators G1 and G2, respectively. Preferably the output voltages from the generators G1 and G2 contain a slight A.C. ripple component which, by introducing a so-called dithering into the operation of control circuit 5, prevents sticking of valve V. The output voltage from generator G1 is applied across a voltage divider comprising a pair of resistors R3 and R4 and the output of the voltage from generator G2 is applied across a voltage divider comprising a pair of resistors R5 and R6. Current from lead L5 is applied, through a dropping resistor R7, to a Zener diode Z2 and a silicon diode D2 which are connected in series to provide a substantially constant voltage, e.g., 3.6 volts, at the lower ends of the voltage dividers comprising resistors R3–R6. The voltage provided at the junction between resistors R3 and R4 thus varies above this predetermined level as a substantially linear function of the speed of the left wheel and the voltage provided at the junction between resistors R5 and R6 varies similarly as a function of the speed of the right rear wheel. The junction between resistors R3 and R4 is connected to the base of an NPN transistor Q1 and the junction between resistors R5 and R6 is connected to the base of a similar NPN transistor Q2. The collectors of transistors Q1 and Q2 are connected to the supply lead L4 and their emitters are connected together and to lead L3 through a common load resistor R8.

The transistors Q1 and Q2 function as a discriminator, that is, the voltage developed across resistor R8 varies as a function of the speed of that rear wheel which is turning the faster and is thus providing the higher tachometer voltage to the base of the respective transistor. The other transistor, to which the lower tachometer voltage is applied, is reverse biased and cut off. The voltage at the emitters of the discriminator transistors Q1 and Q2 is applied to the base of an NPN transistor Q3 which is operated as an emitter follower. The collector of transistor Q3 is connected to supply lead L4 and its emitter is connected to the negative supply lead L3 through a load resistor R9. The emitter of transistor Q3 is also connected to a signal lead S1. Since the emitter follower connection of transistor Q3 provides essentially no voltage gain and only a slight, substantially constant voltage offset, the voltage of the signal applied to lead S1 thus also varies as a function of the speed of the faster of the two rear wheels.

The voltage provided at the junction between resistors R5 and R6 is also applied at the base of an NPN transistor Q4 which is operated as an emitter follower. The collector of transistor Q4 is connected to supply lead L2 through a resistor R10 and the speed variable output signal provided at its emitter is applied to charge a capacitor C1.

The voltage regulated by Zener diode Z2 and diode D2 is also applied to an accelerometer indicated generally at 13. Accelerometer 13 includes a potentiometer R11 across which the regulated voltage is applied. Potentiometer R11 includes a movable tap T which is connected to the base of an NPN transistor Q5 which comprises a portion of an integration circuit 14. The emitter of transistor Q5 is connected to lead L3 through a load resistance comprising a fixed resistor R13 and a rheostat R14. The position of the tap T of potentiometer R11 depends upon or varies as a function of the deceleration of the vehicle in known manner, e.g., by being coupled to a suitably suspended inertial mass as indicated at M. The output voltage from accelerometer 13 thus comprises a deceleration signal. The potentiometer is arranged so that the output voltage from the accelerometer varies from about 0.6 volt at zero deceleration to about 3 volts at a 1 G (one gravity) deceleration. The 0.6 volt level is chosen to compensate for the base-emitter offset voltage of transistor Q5 so that conduction through the collector-emitter circuit of transistor Q5 is closely proportional to the vehicle deceleration. The collector of transistor Q5 is connected, through a diode D4, to the capacitor C1 so that the collector current drawn by transistor Q5 discharges that capacitor. As is explained in greater detail hereinafter, capacitor C1 functions as an integrator to provide a voltage which varies as a function of the time integral of the deceleration signal.

The positive side of capacitor C1 is also connected to ground through a diode D5 and a resistor R15 connected in series and the junction between diode D5 and resistor R15 is connected to supply lead L2 through a diode D6. Diodes D5 and D6 are oriented or polarized so that, when switch S1 is closed, the full source voltage is applied across resistor R15. Diode D5 is thus reverse biased and these elements have no effect on the charge on capacitor C1. However, when switch SW1 is opened so that the source voltage is no longer provided at lead L2, the capacitor C1 is discharged through resistor R15.

The positive side of capacitor C1 is also connected to the base of an NPN transistor Q7 which is operated as an emitter follower. The collector of transistor Q7 is connected directly to supply lead L4 and its emitter is connected to lead L3 through a resistor R17. To the emitter of transistor Q7 is also connected a signal lead S2. The voltage applied to lead S2 thus varies as a function of or is substantially equal to the voltage on capacitor C1.

Signal leads S2 and S1 are connected, through respective resistors R18 and R19, to the base terminals of respective ones of a pair of NPN transistors Q8 and Q9 which comprise part of a differential amplifier circuit 15. A preselected bias voltage is applied to the base of transistor Q8 by a network comprising resistors R20 and R21 and rheostat R22. A similar preselected bias voltage is applied to the base of transistor Q9 by a network comprising resistors R24, R25 and R26. Rather than being connected to the grounded lead L3, however, the resistor R25 is interconnected with the actuator driving amplifier 12 for applying negative feed-back as described in greater detail hereinafter.

The collector of transistor Q9 is connected directly to supply lead L5 and the collector of transistor Q8 is connected to this lead through a resistor R29 and a diode D8. The emitters of transistors Q8 and Q9 are commonly connected to the collector of an NPN transistor Q10. The emitter of transistor Q10 is connected to lead L3 through a resistor R30 and a predetermined bias voltage is applied to its base by a voltage divider comprising a pair of resistors R31 and R32. A substantially constant current thus flows through the emitter-collector circuit of transistor Q10. This constant current is shared by the transistors Q8 and Q9 causing them to be highly responsive to differential signals applied between their base terminals in known manner. The output voltage at the collector of transistor Q8 thus varies as a function of the algebraic difference between the signals applied to the base input terminals of the transistors Q8 and Q9.

The output voltage provided at the collector of transistor Q8 is applied to the base of a PNP transistor Q11 which is operated in a common emitter mode to provide further amplification of this difference signal. The collector of transistor Q11 is connected to lead L3 through a load resistor R36 and its emitter is connected to lead L5 through a resistor R37. The diode D8 provides a voltage drop which offsets and compensates for temperature changes and for the base-emitter voltage drop of the transistor Q11 so that the output signal provided at the collector of transistor Q11 remains more exactly proportional to the output signal from the collector of transistor Q8.

The amplified differential output signal provided at the collector of transistor Q11 is applied, through a resistor R38, to the base of an NPN transistor Q12 which comprises part of the power amplifier 12 mentioned previously. The base-emitter circuit of transistor Q12 is shunted by capacitor C2 for reducing the response of this amplifier to high frequency oscillations. Transistor Q12 is operated in a common emitter mode with its emitter connected directly to lead L3 and its collector connected to lead L5 through a load resistor R39. The output signal provided at the collector of transistor Q12 is applied to the base of a PNP transistor Q13 which is also operated in a common emitter mode, the emitter of transistor Q13 being connected directly to lead L5 and its collector being connected to lead L3 through a load resistor R40. The further amplified signal provided at the collector of transistor Q13 is applied to the base of an NPN transistor Q14 which is operated as an emitter follower. The collector of transistor Q14 is connected to supply lead L2 and the output signal provided at its emitter is applied to variably energize the armature coil H2 of the actuator 11. Winding H2 is shunted by a diode D9 for shunting inductive transients. The output signal provided at the emitter of transistor Q14 is also applied to a voltage divider comprising a pair of resistors R42 and R43. The resistor R25 in the biasing network for the differential amplifier transistor Q9 is connected to the junction between resistors R42 and R43. This connection provides negative feedback from the power amplifier 12 to the differential amplifier 15 for improving linearity of operation in conventional manner.

The operation of this system is substantially as follows. When the car is rolling, the tachometer generators G1 and G2 develop voltages which are substantially proportional to the speeds of the respective rear wheels. Prior to braking, these speeds are substantially equal and thus either tachometer voltage is effectively representative of the actual speed of the vehicle. When the driver of the automobile applies the brakes, e.g., by depressing the brake pedal 4, the switch SW1 is closed and power is applied to the system. Immediately upon energization of the system and before any substantial braking force is developed, the voltage signal which represents the speed of the right rear wheel is applied, at low impedance through the emitter-follower transistor Q4, to capacitor C1. Because of the low source impedance, charging of capacitor C1 takes place effectively instantaneously. Capacitor C1 is thus initially charged to a voltage which represents the actual speed of the vehicle prior to braking. This then establishes the initial condition against which braking effect can be compared. As the vehicle starts to decelerate, the line signal representing the right wheel speed drops below the voltage to which capacitor C1 was previously charged and thus the transistor Q4 becomes cut-off and no longer affects the charge on the capacitor, unless the speed of the right rear wheel subsequently becomes equal to or greater than the linear velocity of the vehicle, in which case transistor Q4 ceases to be cut-off and thus permits capacitor C1 to again be charged during application of the brakes.

As vehicle decelerates, the accelerometer 13 provides a voltage which is generally proportional to the rate at which the vehicle speed is decreasing and this voltage causes transistor Q5 to discharge capacitor C1 at a rate which is also substantially proportional to the rate of deceleration. The voltage on capacitor C1 thus varies as a function of the time integral of the rate of deceleration and, accordingly, the voltage on capacitor C1 continues to be an analog of the actual speed of the car. In one sense, this voltage results from an analog computation of speed based upon information provided by an inertial sensor, the accelerometer 13. In other words, the accelerometer 13 effects a discharge of capacitor C1 so that the voltage remaining on the capacitor comprises the initial charge minus the time integral of the rate of deceleration of the vehicle or vehicle velocity. Thus a signal voltage is obtained which is accurately representative of vehicle speed and which is independent of wheel speed during braking.

The vehicle speed analog voltage obtained from capacitor C1 is applied, through the emitter-follower transistor Q7, lead S2 and resistor R19, to one of the inputs of the differential amplifier 15. As noted previously, a signal which represents the speed of the faster rear wheel of the automobile is applied, through lead S1 and resistor R19, to the other input of the differential amplifier. The differential amplifier functions as a voltage comparator to compare these two input voltages, its output representing the difference between them. The output signal from the differential amplifier thus varies substantially as a function of the difference between the speed of the faster of the rear wheels and the actual speed of the automobile as represented by the voltage on the integrating capacitor C1. Accordingly, the armature coil H2 of actuator 11 is energized to an extent which also varies as a function of this difference. As noted previously, actuator 11 controls a power brake boost system by means of valve V to relieve the brake pressure and thus to reduce the braking force to an extent which varies as a function of the energization of the armature winding H2. Accordingly, braking force is reduced as wheel speed drops below the computed actual speed, the amount of the reduction being a substantially linear and single-valued function of the speed difference. This reduction in braking force as slip increases causing skidding to be substantially reduced by reducing the force causing the skidding. In a system constructed as illustrated, the gain of the amplifiers 12 and 15 was adjusted so that the coil H2 was fully energized to produce maximum reduction in braking force when the difference between the wheel speed and the calculated actual speed as represented by the voltage on capacitor C1 was substantially equal in this example to 15 m.p.h. Since the extent of braking force reduction varies substantially as a proportional function of the degree of wheel slip, a very stable control of skidding results.

As may be seen, this anti-skid system does not require the provision of separately controllable brake means for each wheel as do prior art systems which respond to differences between the speeds of different wheels. Since the system employs the speed of the faster one of the two sensed wheels, as its measure of wheel speed, it does not reduce the common braking force if only one wheel should skid, as might happen if just that one wheel hit an icy patch, but rather produces a reduction in braking force only when the faster of the two wheels drops below the vehicle speed. Further, since the rate at which wheel speed is permitted to fall depends upon the actual rate of deceleration obtained, different braking forces can be applied under different traction conditions.

Figure 4:
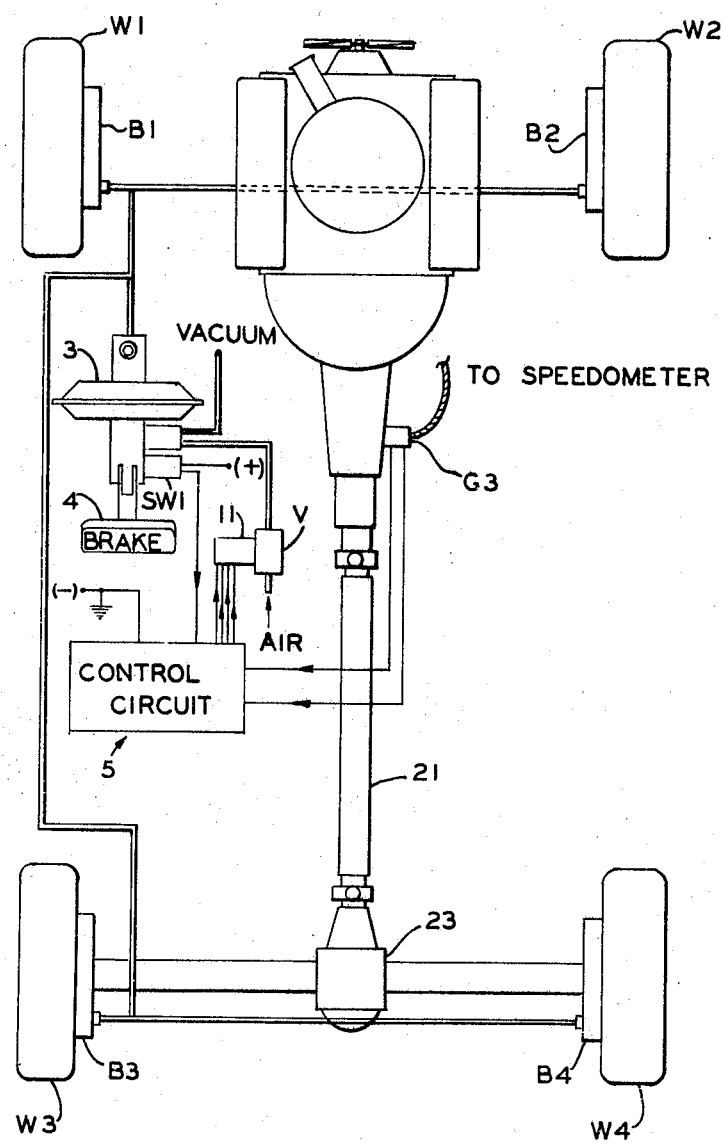
FIG. 4 is a diagrammatic illustration of an automobile employing another embodiment of the anti-skid braking system of this invention.

The embodiment illustrated in FIG. 4 employs only one tachometer generator G3 instead of the two shown in FIG. 1. Tachometer generator G3 is conveniently driven from the conventional speedometer coupling incorporated into the vehicle's transmission so that the generator is driven at a speed which is proportional to the speed of the vehicle's propeller shaft 21. Rear wheels W3 and W4 are driven by the propeller shaft 21 through a conventional differential 23 so that the output voltage provided by generator G3 is substantially proportional to the average of the speeds of the two wheels. The output signal thus varies as a function of the speed of each rear wheel.

Tachometer generator G3 is to be substituted for generator G2 in the circuit diagram of FIGS. 2 and 3 and the control will then operate to provide a mode of operation in which braking force is reduced if the speed of either or both rear wheels begin to skid. From a consideration of the operation of the differential 23, it can be seen that the rate at which the reduction in force occurs is less if only one wheel skids than if both lose traction at once. Since only one tachometer generator is used, the transistor Q1 associated with the omitted generator would also be omitted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A braking system for a wheeled vehicle provided with brake means for applying a braking force to at least one wheel thereof, said system comprising:
means for generating a speed signal which varies as a function of the speed of said wheel;
means for providing a deceleration signal which varies as a function of the deceleration of said vehicle independently of the speed of said wheel;
integrator means, including a capacitor, for integrating said deceleration signal, the voltage on said capacitor being an analog of the speed of said vehicle;
means for charging said capacitor upon initial braking to a voltage corresponding to the speed of said vehicle at the start of braking; and
means responsive to said speed and the voltage on said capacitor for varying the braking force applied by said brake means to prevent the speed of said wheel from dropping substantially below said vehicle speed as represented by said analog signal thereby to prevent substantial skidding of said wheel.

2. A braking system as set forth in claim 1 wherein said means for generating the speed signal comprises a rotating shaft driving said wheel.

3. A braking system as set forth in claim 2 wherein said means for generating the speed signal further comprises means sensing the rotational speed of said shaft and developing an output signal which is proportional to the rotational speed of said shaft.

4. A braking system as set forth in claim 3 wherein said sensing means comprises a tachometer generator.

5. A braking system as set forth in claim 1 wherein said means for generating the speed signal comprises a tachometer generator.

6. A braking system as set forth in claim 5 wherein said tachometer generator is driven by said wheel.

7. A braking system as set forth in claim 5 wherein said vehicle includes a pair of braked wheels which are driven by a drive shaft through a differential and wherein said tachometer generator is driven at a speed which is proportional to the speed of said drive shaft.

8. A braking system as set forth in claim 1 wherein said means for providing a deceleration signal comprises an accelerometer including a potentiometer having a movable tap, the position of which varies as a function of the rate of deceleration of said vehicle thereby to provide a voltage which varies substantially in proportion to said rate of deceleration.

9. A braking system as set forth in claim 1 wherein said vehicle includes at least two braked wheels and said brake means operates substantially equally on both of said wheels, wherein said system includes respective means for generating a wheel speed signal for each of said wheels, and wherein said means for varying the braking force applied by said brake means responds to the wheel speed signal representing the speed of the faster of said two wheels.

10. A braking system as set forth in claim 1 including means responsive to said deceleration signal for varying the charge on said capacitor at a rate which varies substantially in proportion to the rate of deceleration of said vehicle.

11. A braking system as set forth in claim 1 wherein said means for charging said capacitor upon initial braking applies said wheel speed signal to said capacitor.

12. A braking system as set forth in claim 1 wherein said means for varying the charge on said capacitor includes a transistor the collector of which is connected to said capacitor to discharge said capacitor at a variable rate and wherein said deceleration signal is applied to the base of said transistor to vary the rate of discharge whereby the voltage on said capacitor varies substantially as a function of the time integral of said deceleration signal.

13. A braking system as set forth in claim 1 including means for discharging said capacitor when braking is stopped.

14. A braking system as set forth in claim 1 wherein said means for varying the braking force applied by said brake means includes a differential amplifier having two inputs and wherein said speed signal is applied to one of said inputs and said voltage on said capacitor is applied to the other of said inputs.

15. A braking system as set forth in claim 14 wherein said differential amplifier provides an output signal which varies in amplitude substantially in proportion to the algebraic difference between said speed and said capacitor voltage and wherein said means for varying the braking force is operative to reduce the braking force to an extent which varies substantially as a linear function of the amplitude of said output signal.

16. A braking system as set forth in claim 15 wherein said means for varying the braking force includes an actuator having an operating winding and includes also means for energizing said winding substantially in proportion to the amplitude of said output signal.

17. A braking system for a wheeled vehicle provided with brake means for applying a braking force to at least one wheel thereof, said system comprising:
tachometer means for generating a speed signal the voltage of which is substantially proportional to the speed of said wheel;
means including an accelerometer for providing a deceleration signal which varies as a function of the deceleration of said vehicle independently of the speed of said wheel;
a capacitor;
means for charging said capacitor upon initial braking to a voltage which is substantially proportional to the speed of said vehicle at the start of braking;
means responsive to said deceleration signal for discharging said capacitor during braking at a rate which varies substantially in proportion to the rate of deceleration of said vehicle;
a differential amplifier responsive to said speed signal and the capacitor voltage for providing an output signal the amplitude of which varies as a function of the algebraic difference between the speed signal votlage and the capacitor voltage; and
means for reducing the braking force applied by said brake means by an amount which varies as a function of the amplitude of said output signal.

18. In a vehicle having a plurality of wheels and brakes associated with each of said wheels, means for relieving the pressure in said brakes in response to the vehicle encountering a skid condition and circuit means for actuating said brake pressure relieving means, said circuit means including a capacitor, means for charging said capacitor upon initial braking to a voltage dependent upon the speed of at least one of the wheels of the vehicle, an accelerometer operatively connected with said capacitor and operable to effect a discharge of said capacitor at a rate proportional to vehicle deceleration whereby the voltage remaining on said capacitor comprises the initial charge minus the time integral of the rate of deceleration of the vehicle or vehicle velocity, a voltage comparator circuit for comparing the vehicle velocity with a wheel velocity signal applied thereto from a means associated with a wheel, said comparator circuit providing an output signal when said wheel velocity signal and said vehicle velocity signal differ by a predetermined amount, and means for directing said output signal to said brake pressure relieving means to effect operation thereof by said output signal.

19. In a vehicle as defined in claim 18 wherein said means for charging said capacitor operates to continuously charge said capacitor during actuation of said brakes when the velocity of said at least one wheel is equal to or greater than the velocity of the vehicle.

References Cited

UNITED STATES PATENTS

| 3,235,036 | 2/1966 | Meyer et al. |
| 3,245,727 | 4/1966 | Anderson et al. |
| 3,260,555 | 7/1966 | Packer. |
| 3,275,384 | 9/1966 | Hirzel. |
| 3,362,757 | 1/1968 | Marcheron. |
| 3,401,984 | 9/1968 | Williams et al. |

DUANE A. REGER, Primary Examiner

U.S. Cl. X.R.

188—181; 303—20